(12) United States Patent
Satonaka et al.

(10) Patent No.: US 7,739,046 B2
(45) Date of Patent: Jun. 15, 2010

(54) PARKING SUPPORT DEVICE

(75) Inventors: Hisashi Satonaka, Susono (JP); Masato Okuda, Ann Arbor, MI (US); Hiroshi Toyoda, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 375 days.

(21) Appl. No.: 11/324,583

(22) Filed: Jan. 4, 2006

(65) Prior Publication Data

US 2008/0010018 A1 Jan. 10, 2008

(30) Foreign Application Priority Data

Jan. 12, 2005 (JP) .............................. 2005-005225

(51) Int. Cl.
G05D 1/02 (2006.01)
G06F 17/10 (2006.01)
G06G 7/78 (2006.01)
G01M 15/00 (2006.01)
G01M 17/04 (2006.01)
B60Q 1/00 (2006.01)
B60Q 1/48 (2006.01)
G08G 1/16 (2006.01)
G08G 1/14 (2006.01)

(52) U.S. Cl. .................. 701/300; 73/117.01; 73/432.1; 340/932.2; 340/435; 340/903

(58) Field of Classification Search ................ 180/167, 180/199, 204, 313; 318/587; 340/435, 436, 340/465, 903, 932.2, 995.18; 701/25, 300, 701/42

See application file for complete search history.

(56) References Cited

U.S. PATENT DOCUMENTS 4,931,930 A * 6/1990 Shyu et al. ..................... 701/36
5,004,997 A * 4/1991 Shisgal et al. ................ 340/436
5,574,426 A * 11/1996 Shisgal et al. ................ 340/435

(Continued)

FOREIGN PATENT DOCUMENTS

JP 2002-243857 8/2002

(Continued)

OTHER PUBLICATIONS

Patent Abstracts of Japan, JP 11-255052, Sep. 21, 1999.

(Continued)

*Primary Examiner*—Khoi Tran
*Assistant Examiner*—Nicholas Kiswanto
(74) *Attorney, Agent, or Firm*—Oblon, Spivak, McClelland, Maier & Neustadt, L.L.P.

(57) ABSTRACT

In a parking support device, a distance measuring unit measures a quantity equivalent to a distance from an automotive vehicle to an object existing in a predetermined direction. A storage unit stores a sequence of points indicating results of the measurement performed multiple times. A first object specifying unit generates first object information based on the sequence of points when a length of the sequence of points has exceeded a first reference length. A second object specifying unit generates second object information based on the sequence of points when a length of the sequence of points has exceeded a second, larger reference length. A target parking position is determined based on the first object information in a stage where the first object information is generated.

18 Claims, 10 Drawing Sheets

U.S. PATENT DOCUMENTS

| | | | |
|---|---|---|---|
| 6,061,002 A * | 5/2000 | Weber et al. | 340/932.2 |
| 6,212,452 B1 * | 4/2001 | Shimizu et al. | 701/41 |
| RE37,610 E * | 3/2002 | Tsuchiya et al. | 340/435 |
| 6,828,903 B2 * | 12/2004 | Watanabe et al. | 340/435 |
| 6,898,527 B2 * | 5/2005 | Kimura et al. | 701/301 |
| 6,999,003 B2 * | 2/2006 | Matsukawa et al. | 340/932.2 |
| 7,176,789 B2 * | 2/2007 | Herder | 340/435 |
| 7,230,524 B2 * | 6/2007 | Watanabe et al. | 340/435 |
| 7,248,153 B2 * | 7/2007 | Danz et al. | 340/435 |
| 7,369,940 B2 * | 5/2008 | Frank et al. | 701/300 |
| 2005/0035879 A1 * | 2/2005 | Gotzig et al. | 340/932.2 |
| 2005/0060073 A1 * | 3/2005 | Tanaka et al. | 701/36 |
| 2005/0285758 A1 | 12/2005 | Matsukawa et al. | |
| 2006/0139181 A1 * | 6/2006 | Danz et al. | 340/932.2 |
| 2006/0167633 A1 * | 7/2006 | Satonaka et al. | 701/300 |
| 2008/0167819 A1 * | 7/2008 | Breed | 701/300 |

FOREIGN PATENT DOCUMENTS

| | | |
|---|---|---|
| JP | 2003-048500 | 2/2003 |
| JP | 2003-081042 | 3/2003 |
| JP | 2003-246249 | 9/2003 |
| JP | 2003-270344 | 9/2003 |

OTHER PUBLICATIONS

Patent Abstracts of Japan, JP 2002-120677, Apr. 23, 2002.
Patent Abstracts of Japan, JP 2002-228734, Aug. 14, 2002.
Patent Abstracts of Japan, JP 2002-170103, Jun. 14, 2002.

* cited by examiner

PARKING SUPPORT DEVICE

BACKGROUND OF THE INVENTION

1. Field of the Invention

The present invention relates to a parking support device which supports running of an automotive vehicle to a target parking position.

2. Description of the Related Art

Conventionally, the method of specifying an outline shape of an object or a parked vehicle by an approximation of a series of distance data (or a sequence of points) with a straight line, in which the series of distance data of the object or the parked vehicle is detected by a distance measuring unit, such as a laser radar, so that a target parking position and a target parking direction are determined for the self-vehicle is known. For example, refer to Japanese Laid-Open Patent Application No. 2002-243857.

In the case of the above-mentioned conventional method, the series of distance data (or the sequence of points) to the object detected by the distance measuring unit is approximated with the straight line, and the target parking position and the target parking direction are determined based on the approximate straight line. Hence, if the distance measurement is performed at many detecting points on the object, the object information of the object with higher accuracy can be acquired, and the target parking position and direction with higher reliability can be determined.

On the other hand, the above-mentioned method requires many detecting points (the sequence of points with a sufficient length) to derive an approximate straight line, and it is difficult for the above-mentioned method to bring forward the start timing of parking support control (namely, the time the target parking position and the target parking direction can be determined).

In fact, in many cases, parked vehicles are on both the sides (the front and back sides) of a parking space, and in some case the sequence of points with a sufficient length cannot be obtained with respect to the parked vehicle on the back side of the parking space in the normal process of moving the self vehicle to the parking start position.

SUMMARY OF THE INVENTION

An object of the present invention is to provide an improved parking support device in which the above-mentioned problems are eliminated.

Another object of the present invention is to provide a parking support device which is capable of bringing forward the start timing of parking support control while maintaining high reliability.

In order to achieve the above-mentioned objects, the present invention provides a parking support device which supports running of an automotive vehicle to a target parking position, the parking support device comprising: a distance measuring unit measuring a quantity equivalent to a distance from the vehicle to an object existing in a predetermined direction; a storage unit storing a sequence of points indicating results of the measurement performed by the distance measuring unit multiple times; a first object specifying unit generating a first object information of the object based on the sequence of points when a length of the sequence of points increasing with a movement of the vehicle has exceeded a first reference length; and a second object specifying unit generating a second object information of the object based on the sequence of points when a length of the sequence of points increasing with a further movement of the vehicle has exceeded a second reference length larger than the first reference length, wherein a target parking position is determined based on the first object information in a stage where the first object information is generated by the first object specifying unit.

The above-mentioned parking support device of the invention may be configured so that, when a sequence of points appearing at an interval of more than a predetermined length following the sequence of points the length of which exceeded the second reference length indicates a length larger than the first reference length, a target parking position in a space corresponding to the interval is determined based on both the first object information generated by the first object specifying unit and the second object information generated by the second object specifying unit.

According to the parking support device of the invention, the start timing of parking support control can be brought forward and maintaining high reliability can be attained.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of an embodiment of the present invention with reference to the accompanying drawings.

Figure 1:
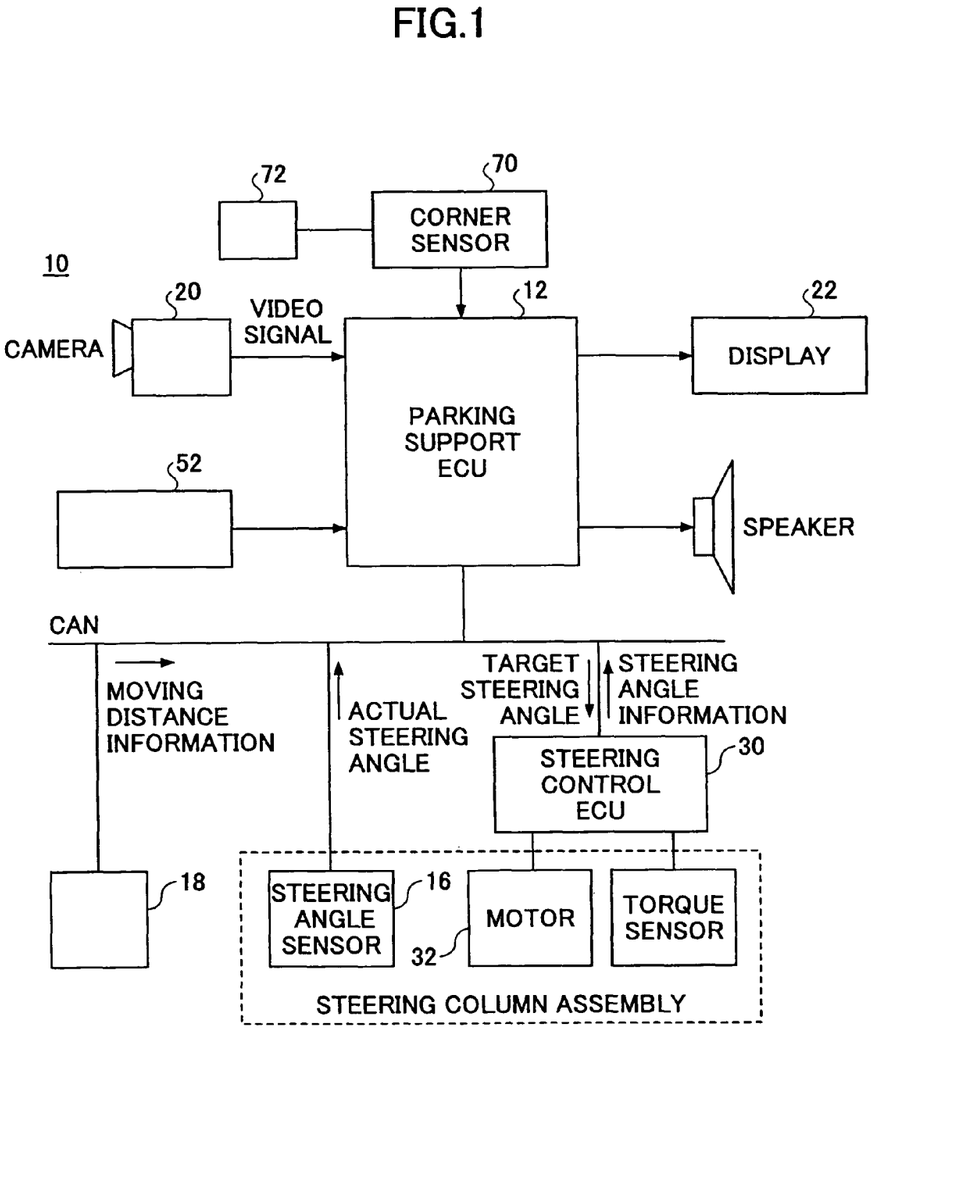
FIG. 1 is a block diagram indicating the composition of a parking support device in an embodiment of the invention.

FIG. 1 shows the composition of a parking support device 10 in an embodiment of the invention.

As shown in FIG. 1, the parking support device 10 is mainly constituted by an electronic control unit 12 (which will be called the parking support ECU 12). The parking support ECU 12 is constituted by a microcomputer which comprises a CPU, a ROM, a RAM, etc. which are interconnected by a bus (which is not illustrated). In the ROM, the program which is executed by the CPU and data are stored.

A steering angle sensor 16 and a vehicle speed sensor 18 are connected to the parking support ECU 12 via a bus of the CAN (Controller Area Network) or an appropriate high-speed communication bus. The steering angle sensor 16 detects the steering angle of a steering wheel (not shown), and the vehicle speed sensor 18 detects the speed of the vehicle.

The vehicle speed sensor 18 may be a wheel speed sensor which is disposed on each of the vehicle wheels to generate a pulse signal with a period proportional to the wheel speed.

A corner sensor (distance measuring unit) 70 which detects a distance from the vehicle to the object (obstacle) using an acoustic wave (for example, ultrasonic wave), an electric wave (for example, millimeter wave), a light wave (for example, laser), etc. is connected to the neighboring object information acquisition device 80.

Figure 2:
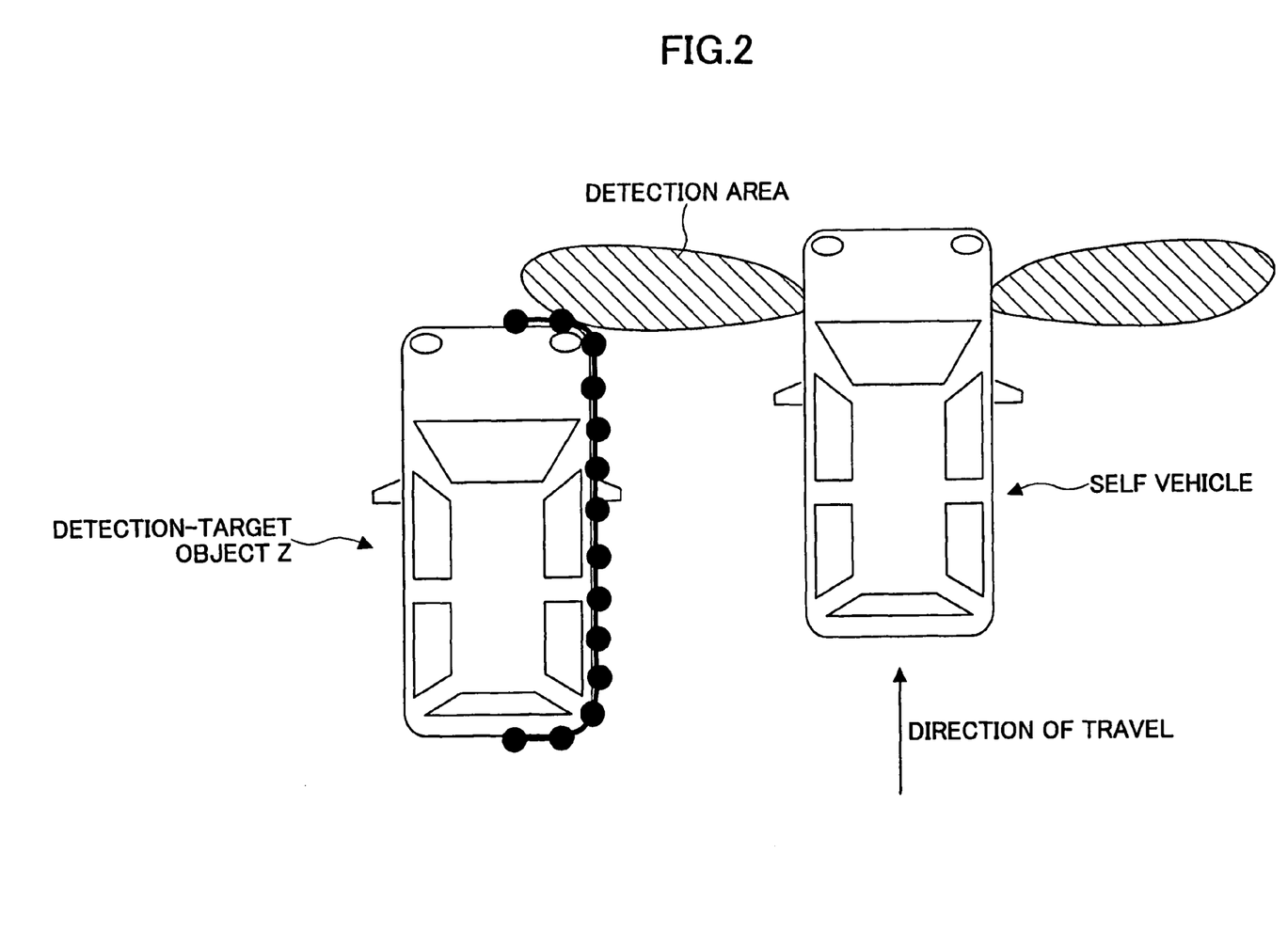
FIG. 2 is a diagram for explaining the detection mode of a neighboring object (a neighboring vehicle) being detected by a distance measuring sensor.

The corner sensor 70 may be a distance measuring unit which detects a distance, such as a stereo vision, besides a laser radar, a millimeter wave radar and an ultrasonic radar. The corner sensor 70 is disposed on each of the right and left sides of the vehicle front part. FIG. 2 shows the detection mode of a neighboring object (or a neighboring vehicle Z) being detected by the corner sensor 70.

As shown in FIG. 2, the corner sensor 70 emits an acoustic wave or the like in the predetermined direction from the center of the vehicle width, and receives the reflected wave from the object so that a distance from the vehicle to the object on the vehicle side is detected.

The result of detection of the corner sensor 70 is stored into a predetermined memory 72 (for example, an EEPROM) connected to the corner sensor 70.

As shown in FIG. 2, the reflection points (which are indicated by the black dots in FIG. 2) of the acoustic wave emitted from the corner sensor 70 will move along the side of the neighboring vehicle Z with movement of the self vehicle.

Figure 3:
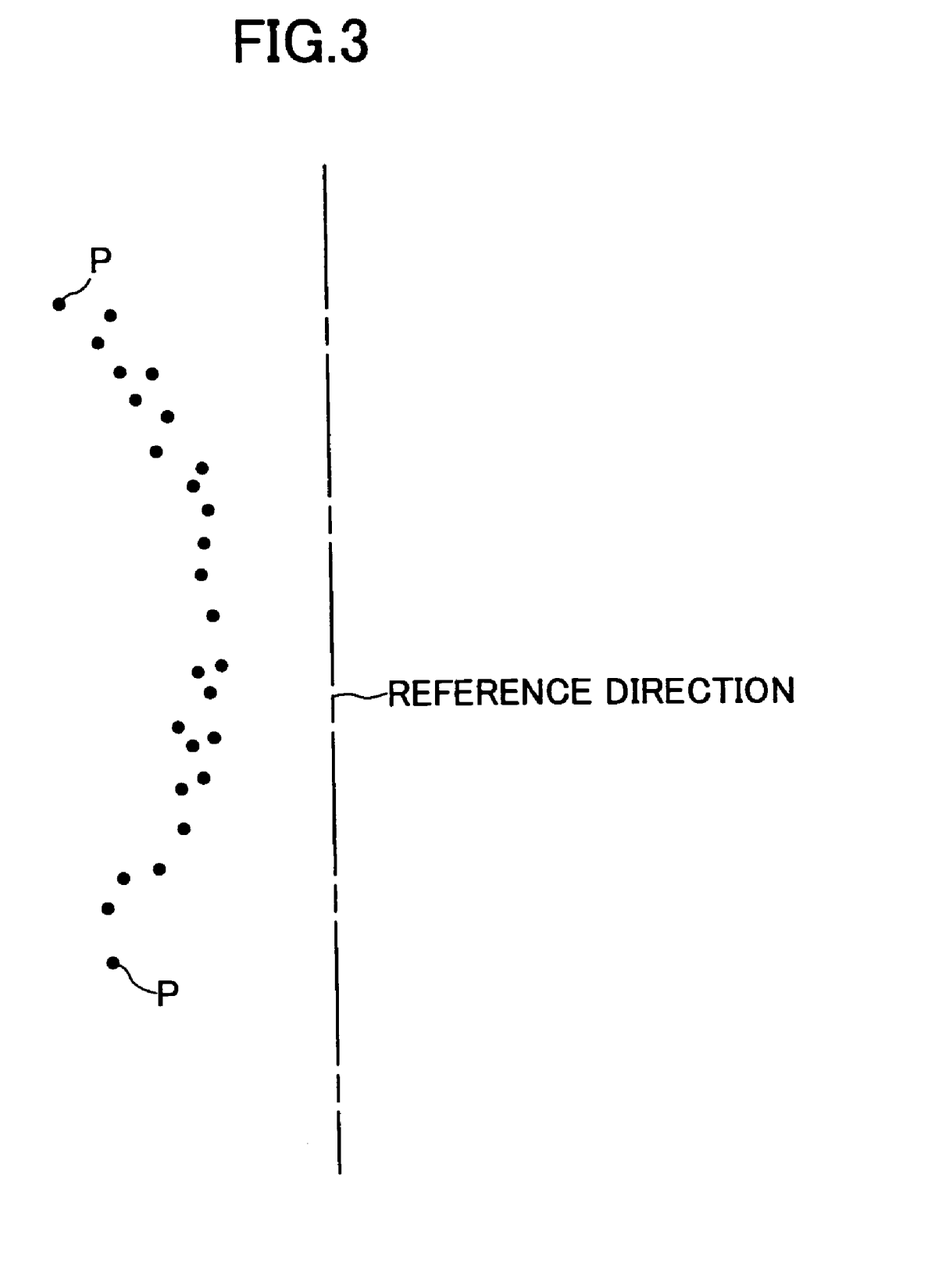
FIG. 3 is a diagram for explaining a sequence of points concerning the neighboring vehicle obtained when the vehicle (self-vehicle) provided with the distance measuring sensor goes by the neighboring vehicle of FIG. 2.

FIG. 3 shows the sequence of points concerning the neighboring vehicle Z obtained when the vehicle (self-vehicle) provided with the corner sensor 70 goes by the neighboring vehicle Z of FIG. 2.

In this case, the corner sensor 70 outputs the point data indicating the reflection points (the set of the reflection points of the acoustic wave) of the object as shown in FIG. 3 based on the received data, and the set of the point data (the sequence of points) may be stored into the memory 72 at any time for every output cycle.

In the parking support device 10 of FIG. 1, a reverse shift switch (not illustrated) and a parking switch 52 which are provided in the vehicle are connected to the parking support ECU 12.

The reverse shift switch outputs an ON signal when the gearbox lever is operated by the user to the reverse position, and otherwise the output signal of the reverse shift switch is maintained in OFF state. The parking switch 52 is disposed in the passenger compartment, and can be operated by the user. An output signal of the parking switch 52 is maintained in OFF state in the ordinary state of the parking switch 52, and turned into ON state when the parking switch 52 is operated by the user.

Based on the output signal of the parking switch 52, the parking support ECU 12 detects whether the user currently needs parking support control. For example, when the parking switch 52 is turned ON by the user during running of the vehicle, the parking support ECU 12 detects the ON state of the output signal of the parking switch 52, or the user's need for parking support control. And the parking support ECU 12 determines a target parking position appropriate for parking of the vehicle in the circumference of the vehicle, based on the result of a subsequent detection of the corner sensor 70.

The method of determination of a target parking position or a target parking direction will be described later.

If the parking switch 52 is turned ON and the reverse shift switch is turned ON, then the parking support ECU 12 prepares and starts the parking support control processing. The parking support control includes not only the vehicle control, such as steering control during running of the vehicle to a target parking position, but also the supply of control information to the driver, such as a guidance message to support running of the vehicle to a parking start position.

In the following, a vehicle position when the parking switch 52 is turned ON and the reverse shift switch is turned ON will be called the parking start position.

Figure 4:
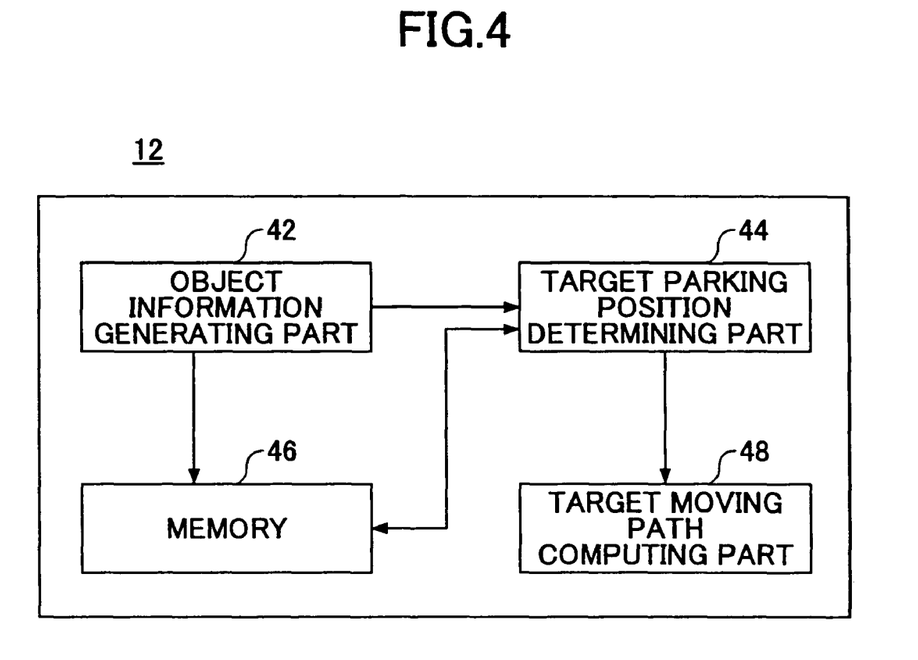
FIG. 4 is a block diagram indicating the functional composition of a parking support ECU of this embodiment.

FIG. 4 shows the functional composition of the parking support ECU 12 of this embodiment. As shown in FIG. 4, the parking support ECU 12 comprises an object information generating part 42, a target parking position determining part 44, a memory part 46, and a target moving path computing part 48. Hereafter, the composition and the function of each part will be explained.

Figure 5A:
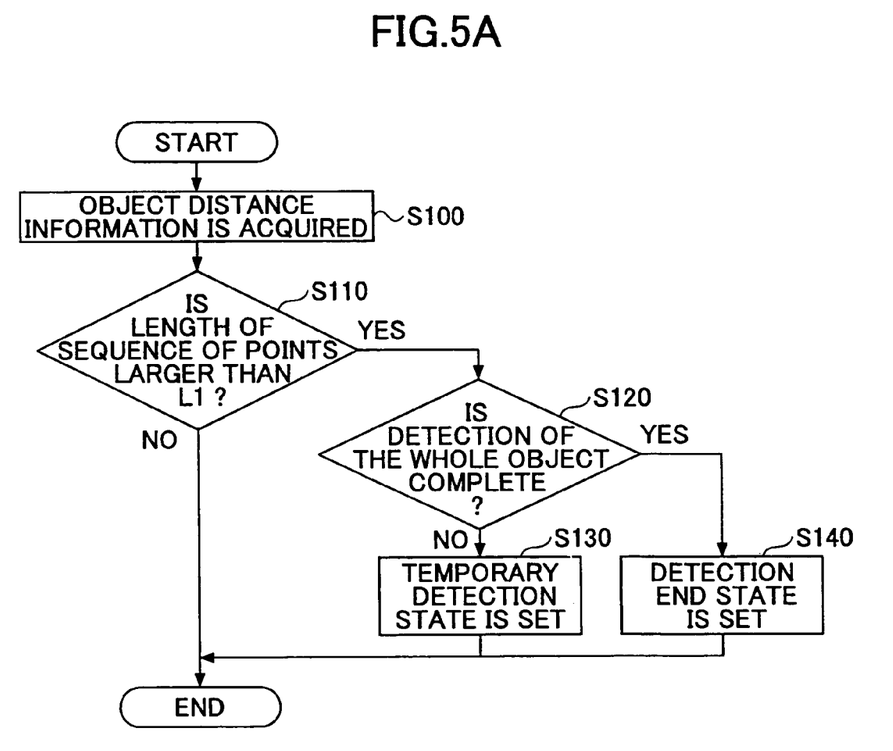
FIG. 5A and FIG. 5B are flowcharts for explaining the main routine of the processing performed by an object information generating part of this embodiment.

FIG. 5A is a flowchart for explaining the main routine of the processing performed by the object information generating part 42 of this embodiment.

The processing of FIG. 5A may be started in a stage where the sign of parking start is detected. For example, when the parking switch 52 is turned ON, when the vehicle speed is below a predetermined value, or when it is determined that the current position of the vehicle is in a parking lot according to the map data of the navigation device, the processing of FIG. 5A is started.

Upon start of the processing of FIG. 5A, the result of detection (a sequence of points) of the distance measuring sensor 70 from the current vehicle position to the predetermined distance therefrom is read from the memory 72 by the object information generating part 42 of the parking support ECU 12 at step S100.

Next, at step S110, the object information generating part 42 computes a length of the sequence of points with respect to the read sequence of points, and determines whether the length of the sequence of points is larger than a first reference length L1 (step S110).

The length of the sequence of points in this case may be an index indicating the size of the area where the object (obstacle) is detected, i.e., the size of the detection range by the distance measuring sensor 70. The length of the sequence of points may be, for example, the distance (length) between the endpoints of the sequence of points.

The first reference length L1 may be the necessary minimum length that can be determined as detecting the sequence of points (object) which are not noise elements. The first reference length L1 is, for example, a length value in a range of 50 cm to 1 m.

When the result of the determination at step S110 is negative (or when the length of the sequence of points is less than the first reference length L1, the processing of FIG. 5A is ended.

On the other hand, when the result of the determination at step S110 is affirmative (or when the length of the sequence of points is larger than the first reference length L1, the object information generating part 42 determines whether the detection of the whole object based on the read sequence of points is complete. That is, it is determined whether the distance measuring sensor 70 is in the state where the detection of one object is completed (where the scanning of the distance measuring sensor 70 over the object is completed with the movement of the vehicle), or in the state where a following detection of another object is started.

When the result of the determination at step S120 is negative (or, when the detection of the whole object is not yet complete), the object information generating part 42 generates object information (which will be called the temporary object information) of the above-mentioned object in which the current acquisition is possible, based on the sequence of points related to the object in the middle of the above-mentioned detection, and sets up the flag (which will be called the temporary detection flag) which indicates a temporary object detecting state (step S130).

Specifically, the object information generating part 42 generates the temporary object information related to the position of the endpoint of the object by considering the point P at the edge of the sequence of points of the object in the reference direction (refer to FIG. 6) as being the endpoint of the above-mentioned object.

The reference direction in this case may be parallel to the normal parking direction in the case of parallel parking, or perpendicular to the normal parking direction in the case of garage parking.

The thus generated temporary object information is stored in the predetermined area of the memory part 46 (such as an EEPROM) at any time.

On the other hand, when the result of the determination at step S120 is affirmative (or, when the detection of the whole object is complete), the object information generating part 42 generates the final object information related to the above-mentioned object based on all the sequence of points of the object detected, and sets up the flag (which will be called the detection end flag) which indicates the state of completion of the object detection (step S140).

Specifically, the object information generating part 42 performs straight line approximation or curve approximation of the sequence of all the points related to the object being detected. Generally, the front part of the vehicle can be approximated with a secondary curve, and the side part of the vehicle can be approximated with a straight line or a secondary curve with a small curvature. For this reason, the approximation of the sequence of all the points is computed by performing the selected one or both of the curve approximation with the secondary curve and the straight line approximation with the straight line.

When both of an approximate curve and an approximate straight line are computed by this approximation, one of the computed approximate curve and the computed approximate straight line with its fitness ratio is higher than that of the other can be selected as the result of approximation.

The fitness ratio in this case is a degree of fitness indicating a ratio of the computed approximate curve or approximate straight line to a standard curve (or a plurality of standard curves) generalized based on the shapes of various vehicles.

Evaluation of the fitness ratio is substantially equivalent to evaluating the degree of variation (an average error, a distributed degree) of the distance of the respective one of the points in the sequence of points from the standard curve.

Alternatively, the object information generating part 42 may determine which of an approximate curve or an approximate straight line is selected to obtain the approximation result by applying it, in accordance with a bending angle between two straight lines one of which is formed by connecting one end of the sequence of points and a middle point of the sequence of points while the other of the two straight lines is formed by connecting the other end of the sequence of points and the middle point thereof.

For example, the object information generating part 42 determines that the approximation result is obtained by applying the approximate straight line, when the bending angle is larger than a predetermined angle which is near 180 degrees. On the other hand, when the bending angle is less than the predetermined angle, the object information generating part 42 determines that the approximation result is obtained by applying the approximate curve.

Figure 6:
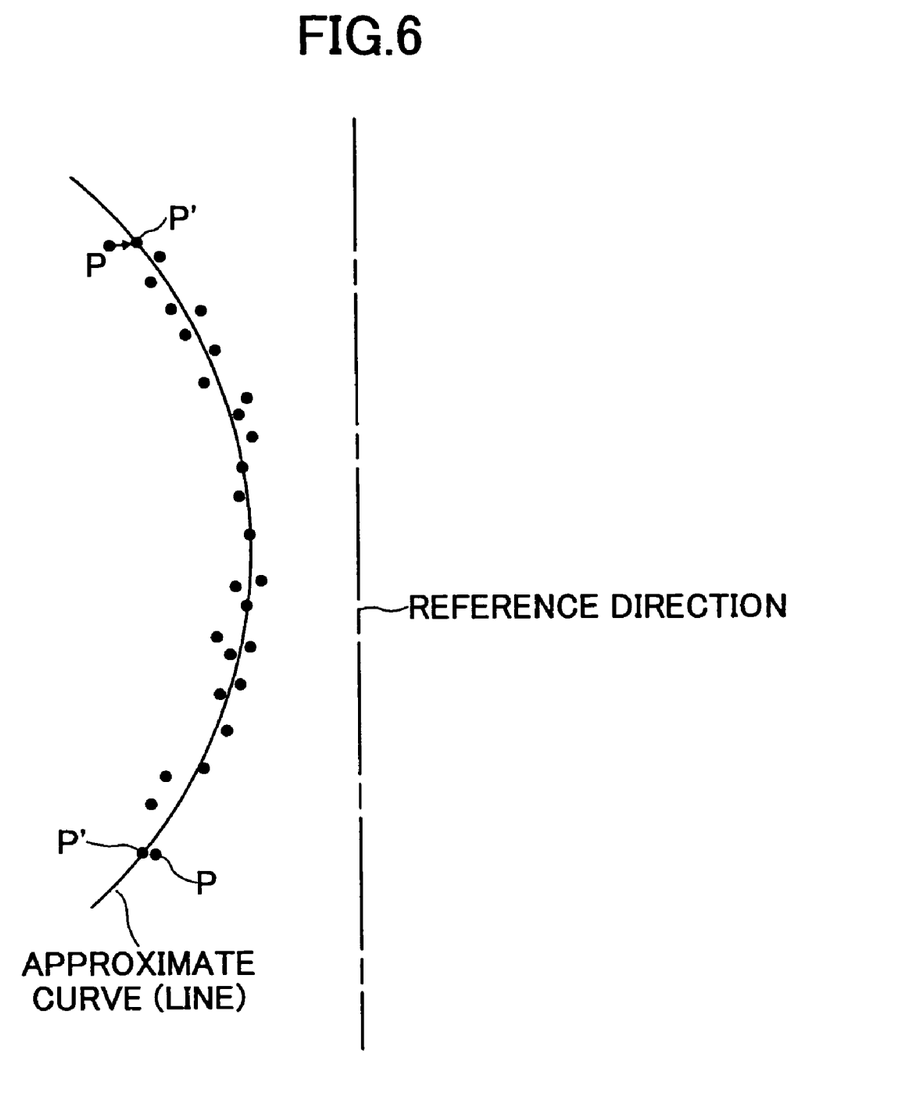
FIG. 6 is a diagram for explaining the mode of correction of endpoints of the object.

When the result of this approximation is obtained, the object information generating part 42 may performs correction to move the point P at the edge of the sequence of points for approximation in the reference direction, as shown in FIG. 6, to the point P' on the approximate curve or the approximate straight line (the point P' is a projection of the point P on the approximate curve in the direction perpendicular to the reference direction). See the above step S130. The point P' is considered as indicating the endpoint of the object being detected so that the object information is generated based on the result of the above correction.

In this respect, any of various correcting methods may be applicable if the applied method uses an approximate curve or an approximate straight line, and the present invention is not limited to the particular method of correction to the point P' as in the above correcting method.

In the above step 140, the object information generating part 42 may generate the information related to the direction of the object as the final object information. At this time, when the object is an automotive vehicle, it can be assumed that if the secondary curve is the approximation of the outline of the front part of the vehicle, the central axis of the secondary curve corresponds to the longitudinal axis of the vehicle, or the parking direction of the vehicle. Moreover, it can be assumed that if the straight line is the approximation of the outline of the side of the vehicle, or the direction of to the straight line or the line connecting the ends of the curve corresponds to the parking direction of the vehicle.

On the other hand, when it is determined in the step S130 that the fitness ratio is less than the predetermined reference value (or when the fitness ratio is poor), the object information generating part 42 may perform the above step S130 alternatively. That is, the object information generating part 42 may determine the edges of the sequence of points concerned in the reference direction as being the endpoints P of the object, and may generate the object information.

In this manner, the final object information generated is stored in the predetermined area of the memory part 46 at any time.

In this embodiment, the object information generating part 42 may use a second reference length L2 (which is, for example, a length value in a range of 1.6 m or more) which is longer than the first reference length L1 instead. In such alternative embodiment, in a stage where the length of the sequence of points has exceeded the second reference length L2, the object information generating part 42 may generate the second temporary object information in the same manner as the generation of the temporary object information or the final object information described above.

Alternatively, the object information generating part 42 may use a third reference length L3 (which is, for example, a length value in a range of 2.5 m or more) which is long enough to perform the above-mentioned approximation in the same manner as the generation of the above-mentioned final object information. In such alternative embodiment, the final object information may be generated in a stage where the length of the sequence of points has exceeded the third reference length L3 (before the completion of the detection of the whole object).

Figure 5B:
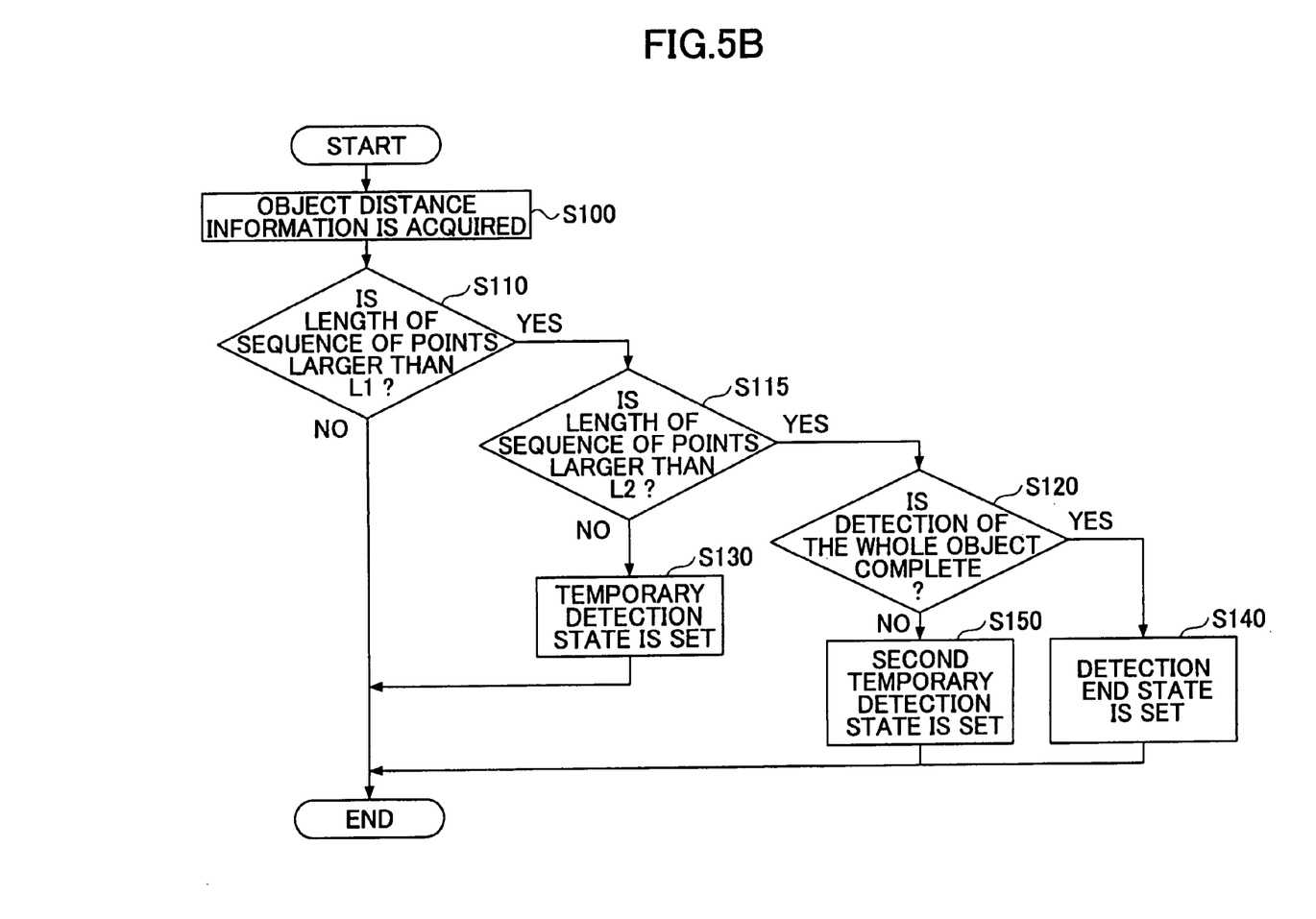

FIG. 5B is a flowchart for explaining the modification of the main routine of the processing in the embodiment of FIG. 5A. In FIG. 5B, the steps which are essentially the same as corresponding steps in FIG. 5A are designated by the same reference numerals, and a description thereof will be omitted.

In this modification, the object information generating part 42 generates the above-mentioned temporary object information (first temporary object information) in the stage where the length of the sequence of points has exceeded the first reference length L1 (step S130).

In the processing of FIG. 5B, the object information generating part 42 determines whether the length of the sequence of points is larger than the second reference length L2 (step S115). In a stage where the length of the sequence of points has exceeded the second reference length L2 (which is a length value in the range of 1.6 m or more), the object information generating part 42 generates the second temporary object information in the same manner as the generation of the above-mentioned final object information at the above step S130, and sets up the second temporary detection flag (step S150).

Thus, the present invention is applicable to any composition if it is the composition that generates the object information based on the sequence of points acquired with respect to one object in at least two or more different detection ranges.

Figure 7:
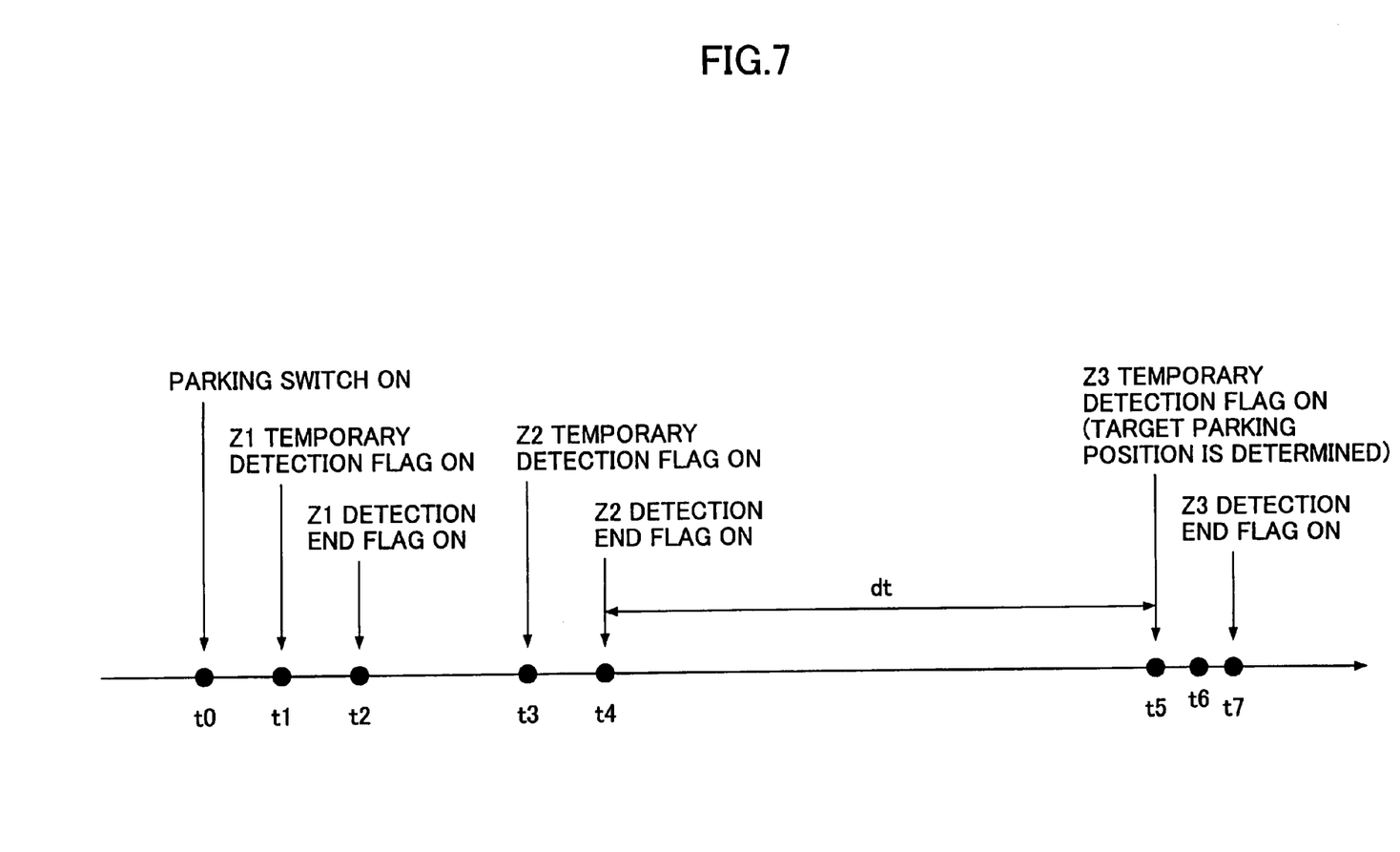
FIG. 7 is a timing chart for explaining the main routine of the processing performed by a target parking position determining part of this embodiment.

FIG. 7 is a timing chart for explaining the main routine of the processing performed by the target parking position determining part 44 of this embodiment.

The processing of FIG. 7 which is performed by the target parking position determining part 44 may be performed in parallel with the processing of FIG. 5A or FIG. 5B which is performed by the object information generating part 42. Similarly, the processing of FIG. 7 may be started in a stage where the sign of the parking start is detected.

Figure 8A:
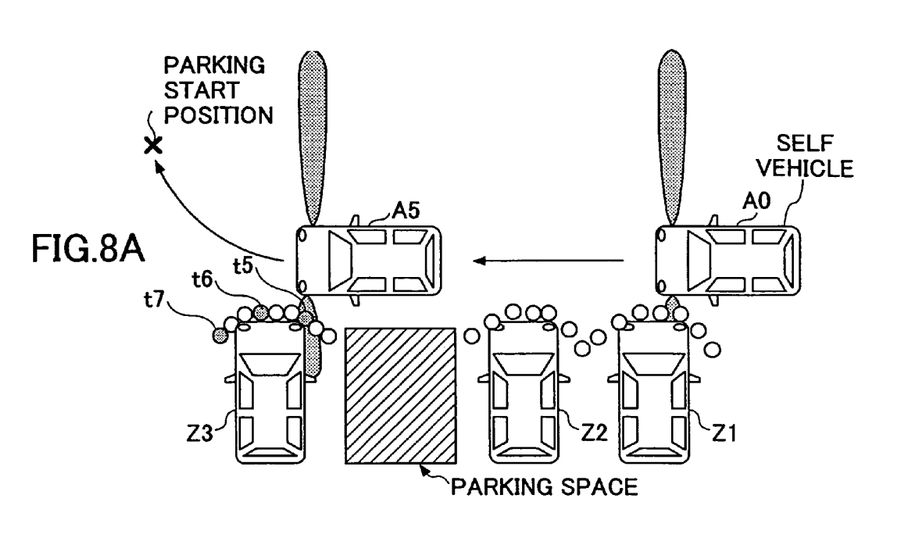
FIG. 8A and FIG. 8B are diagrams for explaining examples of the situation of object detection in the cases of garage parking and parallel parking.
Figure 8B:
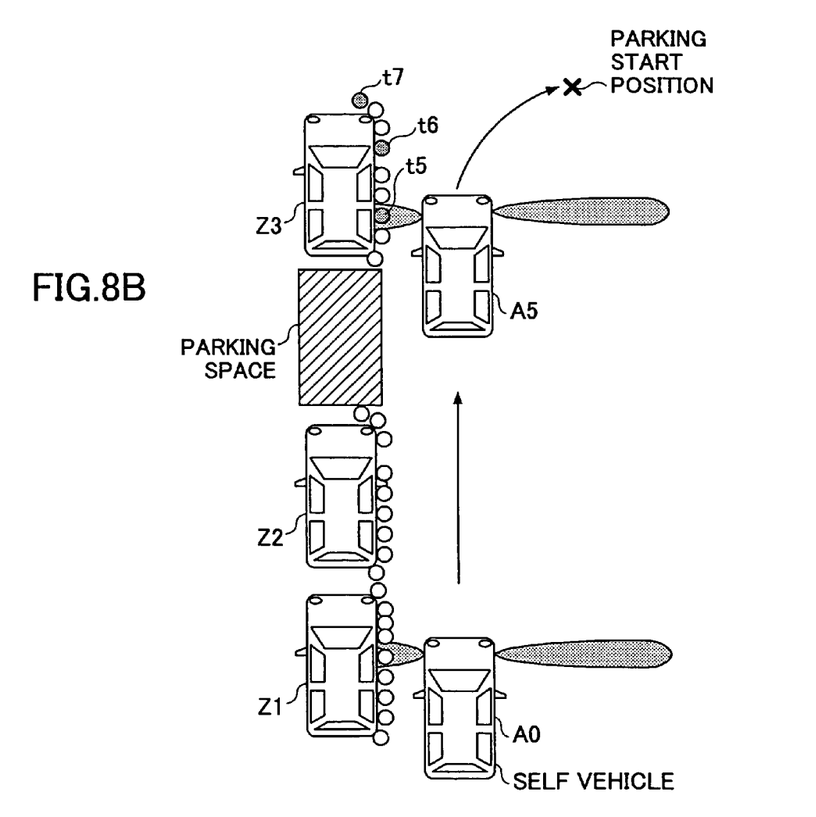

FIG. 8A and FIG. 8B are diagrams for explaining examples of the situations of object detection in the cases of garage parking and parallel parking which correspond to the timing chart of FIG. 7. When the garage parking (FIG. 8A) and the parallel parking (FIG. 8B) are performed inside the parking lot, respective positions of the self-vehicle in the running state at uniform velocity, and the objects (other parked vehicles) around the self-vehicle are illustrated.

Suppose a case where the user turns ON the parking switch 52 in position A0 (time t=t0), and the self-vehicle is moved to position A5 (time t=t5). In this case, the temporary object information of the neighboring vehicle Z1 (object) is generated at time t1, and the final object information of the neighboring vehicle Z1 is generated at time t2.

In the example of FIG. 8A, since the vehicle Z2 is parked immediately lateral of the vehicle Z1, the temporary object information of the vehicle Z2 (object) is generated at time t3 which is slightly subsequent to the time t2, and then the final object information of the vehicle Z2 is generated at time t4.

Since the parking space which can be parked by the self vehicle exists beside the vehicle Z2, in the example of FIG. 8A, there is a comparatively long time interval dt (namely, the interval between the sequence of points which indicate existence of the parking space) until the temporary detection flag of the new object (vehicle Z3) is set up at time t5 after the detection end flag of the vehicle Z2 is set up at time t4.

In FIG. 8A, the illustration of the vehicle positions A2-A4 corresponding to times t2-t4 is omitted for the sake of convenience of explanation, and each of the point data detected at times t5-t7 is indicated by the arrow.

When the temporary detection flag of the vehicle Z3 is set up at time t5, the target parking position determining part 44 reads the temporary object information of the vehicle Z3 and the final object information of the vehicle Z2 from the memory part 46, and determines a target parking position based on the read object information.

Specifically, the target parking position determining part 44 confirms that the distance between the end points of the vehicles Z3 and Z2 is larger than a predetermined value, based on the position of the endpoint (on the side of the parking space) of the vehicle Z3 and the position of the endpoint (on the side of the parking space) of the vehicle Z2, and determines the target parking position based on the above-mentioned endpoints.

Other factors, such as the maximum turning curvature of the vehicle, may be taken into consideration by the determination of this target parking position.

The target parking position determining part 44 may determine a target parking direction (in which direction the vehicle should be parked in the target parking position) based on the final object information of the vehicle Z2. Alternatively, the target parking position determining part 44 may determine the target parking direction based on the temporary object information of the vehicle Z3 and the final object information of the vehicle Z2.

For example, when the final object information of the vehicle Z2 includes the information related to the direction of the vehicle Z2, the target parking direction may be determined based on the direction of the vehicle Z2. In this case, the temporary object information of the vehicle Z3 is not used for the determination of the target parking direction.

In the case of parallel parking (FIG. 8B), the target parking position determining part 44 may determine a target parking direction, which is aligned with the direction of a straight line which is formed by connecting together the endpoints of the vehicles Z2 and Z3, based on the object information of the vehicles Z2 and Z3 (related to the endpoints of the vehicles Z2 and Z3 on the side of the parking space).

Therefore, according to the present embodiment, the target parking position (and the target parking direction) is determined using the temporary object information of the vehicle Z3 from the stage where the part of the vehicle Z3 (namely, the part of the vehicle Z3 larger than the first reference length L) is detected. When compared with the composition in which the target parking position is determined as soon as the whole vehicle Z3 is detected (or the stage where the computation of a curve approximation is possible is reached), the start timing of parking support can be brought forward according to the present embodiment.

Even when it is the case where the parking support control is not performed, according to the present embodiment, a target parking position can be determined if the self vehicle arrives at the parking start position by the running path in which only the part of the vehicle Z3 (or the part of the vehicle Z3 larger than the first reference length L) can be detected. The above-mentioned feature of the present embodiment becomes effective especially when the garage parking is performed with high possibility of starting turning of the steering wheel from the side of the vehicle Z3. In many cases, when performing the garage parking, the detection of the whole vehicle Z3 will not be complete in the process of reaching the parking start position.

To obviate the problem, the first reference length L1 (or the second reference length L2) may be set to different values for the time of garage parking and for the time of parallel parking. For example, the first reference length L1 for the time of parallel parking may be set to larger one.

In the composition in which the parking support control is started from the stage where the target parking position is determined, the target moving path computing part 48 determines the parking start position in which the computation of a suitable target moving path is enabled, in a stage (time t4) where the target parking position (and the target parking direction) is determined by the target parking position determining part 44.

After the parking start position is determined, a voice message for guiding the vehicle to the above-mentioned parking start position may be outputted. For example, the voice message "please turn the steering wheel to the right" may be outputted according to the vehicle position, and/or the vehicle control, such as the automatic steering, for guiding the vehicle to the parking start position may be performed.

Moreover, when the vehicle reaches the parking start position, for example, the voice message "please turn the steering wheel to the right" may be outputted, and/or the automatic intervention braking may be performed so that the driver of the vehicle is urged for a stop of the vehicle.

In the process of reaching the parking start position from the point where the target parking position is determined as described above, the correction or adjustment of the target parking position and the target parking direction may be performed based on a further detection result (the sequence of points) of the distance measuring sensor 70.

For example, in the above-mentioned example, when the detection end flag of the vehicle Z3 is set up at time t7 in the process in which the parking start position is reached, the target parking position determining part 44 may correct the target parking position and the target parking direction (and the parking start position determined thereafter) based on the newly generated final object information of the vehicle Z3 (the information related to the corrected endpoint P' and direction of the vehicle Z3), instead of based on the temporary object information of the vehicle Z3.

Alternatively, at time t6 when the length of the sequence of points of the vehicle Z3 (FIG. 7, FIG. 8A) has exceeded the second reference length L2 (which is a length value in the range of 1.6 m or more), the target parking position determining part 44 may correct the target parking position based on the sequence of the increased number of points of the vehicle Z3 (the second temporary object information), instead of based on the temporary object information of the vehicle Z3.

When the information related to the direction of the vehicle Z3 is acquired, the target parking position determining part 44 may determine a target parking direction θtg in the angle range of an acute angle which is formed by the respective directions of the vehicles Z2 and Z3. That is, under the situation where the vehicle Z3 is parked along an inclination line at the angle θ3 (0<θ3<90) to the vehicle Z2, the target parking direction θtg is determined so as to meet the conditions: 0<θtg<θ3. Preferably, the target parking direction θtg is determined as θtg=θ3/2.

As shown in FIG. 1, a back monitor camera 20 disposed at the central part of the vehicle rear bumper is connected to the input of the parking support ECU 12, and a display 22 disposed in the passenger compartment is connected to the output of the parking support ECU 12.

The back monitor camera 20 is an imaging unit, such as a CCD camera, which takes an image of the scenery of the back of the vehicle in the range of a predetermined angle and supplies a video signal indicating the taken image, to the parking support ECU 12.

The parking support ECU 12 displays the taken image (the actual image of the back scenery) of the back monitor camera 20 on the display 22, when both the reverse shift switch and the parking switch 52 are in ON state.

Figure 9:
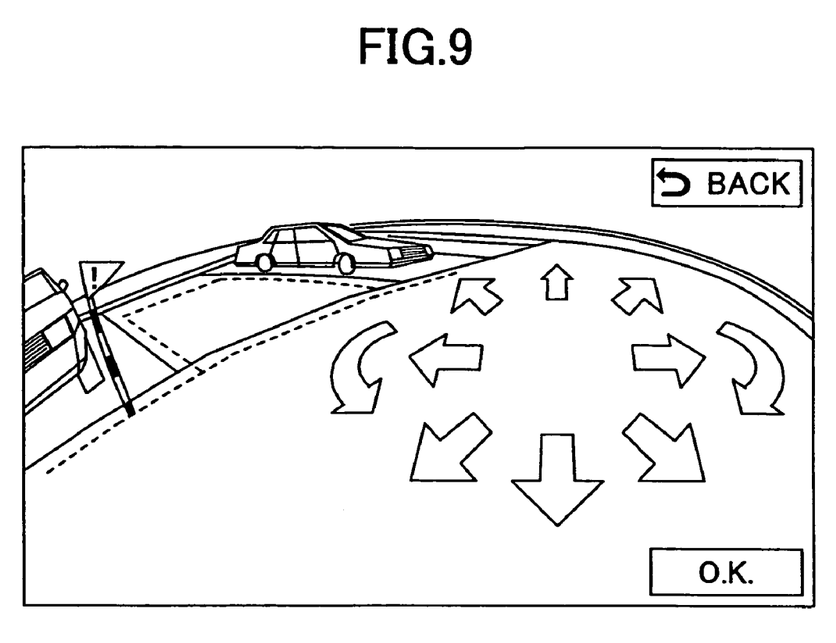
FIG. 9 is a diagram indicating an example of a touch panel for setting up a target parking position on a display.

At this time, as shown in FIG. 9, the superposition indication of a target parking frame is given on the taken image in the garage parking screen on the display 22. The target parking frame may be displayed by a graphical indication imitating the outside of the vehicle or the actual parking frame, and it may be, for example, in the form that the position and direction of the target parking frame can be visually recognized by the user. And two kinds of target parking frame may be prepared: the indication for garage parking and the indication for parallel parking.

In this example, the initial display position and direction of the target parking frame displayed on the display 22 correspond to the target parking position and the target parking direction determined based on the object information obtained as described above.

The position and direction of this target parking frame (namely, the target parking position and the target parking direction) may be finalized without change by a depression of the O.K. button by the user. Alternatively, as shown in FIG. 9, adjustment of the position of the target parking frame etc. may be enabled, before depression of the O.K. button, by depressing the touch panel buttons for carrying out translational movements of the target parking frame in the four directions of up, down, right and left, and a rotational movement of the target parking frame.

When the position of the target parking frame is finalized and the back movement of the vehicle is started, the parking support ECU 12 estimates, during automatic guiding control, a vehicle position of the self-vehicle by using an amount of vehicle travel computed from the output signal of the vehicle speed sensor 18 and a steering angle position obtained from the output signal of the steering angle sensor 16. And the parking support ECU 12 computes a target steering angle in accordance with a deviation of the estimated vehicle position from the target moving path, and transmits the target steering angle concerned to the steering control ECU 30.

The steering control ECU 30 controls the motor 32 to attain the computed target steering angle. The motor 32 is disposed in the steering column of the vehicle and provided to rotate the steering shaft in accordance with the rotation angle.

Alternatively, the target moving path computing part 48 may be configured to compute an estimated vehicle position during the parking support control, based on the output signal of the steering angle sensor 16 and the output signal of the vehicle speed sensor 18, and compute a current target moving path in accordance with a deviation of the estimated vehicle position from the previously computed target moving path, so that a target steering angle in the estimated vehicle position may be determined based on the current target moving path concerned.

The computation of the target moving path may be carried out every time the vehicle is moved by a predetermined distance (for example, 0.5 m). In order to leave the margin to perform such adjustment, a turning curvature (for example, a turning curvature up to 90% of the maximum turning curvature) which is slightly smaller than the maximum turning curvature of the vehicle may be used for determination of the initial target moving path.

The present invention is not limited to the above-described embodiments, and variations and modifications may be made without departing from the scope of the present invention.

For example, in the above-described embodiment, the edge of the object in the reference direction is simply considered as the endpoint of the object used for the determination of a target parking position. Alternatively, the above embodiment may be modified so that the point of the object nearest to the target moving path is considered as the endpoint of the object used for the determination of a target parking position.

And when the object is an automotive vehicle, the above embodiment may be modified so that the point of the edge of the vehicle along the side surface of the vehicle is considered as the endpoint of the object used for the determination of a target parking position.

In addition, in the above-described embodiments, the corner sensor 70 is disposed on each of the right and left sides of the vehicle front part. Alternatively, the corner sensor 70 may be disposed on each of the right and left sides of the central part of the vehicle, and/or each of the right and left sides of the vehicle rear part additionally or by replacement.

In the above-described embodiments, it is supposed that the object is an automotive vehicle, for the sake of convenience of description. However, the object according to the present invention may be any other entity, such as a bicycle, a two-wheeled vehicle, a wall, two or more pylons, etc.

Further, the present application is based upon and claims the benefit of priority from the prior Japanese patent application No. 2005-005225, filed on Jan. 12, 2005, the entire contents of which are incorporated herein by reference.

What is claimed is:

1. A parking support device which supports running of an automotive vehicle to a target parking position, comprising:
   a distance measuring unit measuring a quantity equivalent to a distance from the vehicle to an object existing in a predetermined direction;
   a storage unit storing a sequence of points indicating results of the measurement performed by the distance measuring unit multiple times, wherein the sequence of points is based on a geometry of an object;
   a first object specifying unit which makes a determination of whether a length of the sequence of points increasing with a movement of the vehicle has exceeded a first reference length, and which generates a first object information of the object based on the sequence of points when the length has exceeded the first reference length; and
   a second object specifying unit which makes a determination of whether a length of the sequence of points increasing with a further movement of the vehicle has exceeded a second reference length larger than the first reference length, and which generates a second object information of the object based on the sequence of points when the length has exceeded the second reference length,
   wherein a target parking position is determined based on the first object information in a stage where the first object information is generated by the first object specifying unit, and wherein, after the second object information is generated by the second object specifying unit, the target parking position based on the first object information is corrected based on the second object information, and
   wherein the first and second object information are approximations of the geometry of the object.

2. A parking support device which supports running of an automotive vehicle to a target parking position, comprising:
   a distance measuring unit measuring a quantity equivalent to a distance from the vehicle to an object existing in a predetermined direction;
   a storage unit storing a sequence of points indicating results of the measurement performed by the distance measuring unit multiple times, wherein the sequence of points is based on a geometry of an object;
   a first object specifying unit which makes a determination of whether a length of the sequence of points increasing with a movement of the vehicle has exceeded a first reference length, and which generates a first object information of the object based on the sequence of points when the length has exceeded the first reference length; and
   a second object specifying unit which makes a determination of whether a length of the sequence of points increasing with a further movement of the vehicle has exceeded a second reference length larger than the first reference length, and which generates a second object information of the object based on the sequence of points when the length has exceeded the second reference length,
   wherein, when a sequence of points appearing at an interval of more than a predetermined length following the sequence of points the length of which exceeded the second reference length indicates a length larger than the first reference length, a target parking position in a space corresponding to the interval is determined based on both the first object information generated by the first object specifying unit and the second object information generated by the second object specifying unit, and
   wherein, after the length of the sequence of points having exceeded the first reference length has further exceeded the second reference length, the target parking position is corrected based on the second object information generated based on the sequence of points the length of which exceeded the second reference length, and
   wherein the first and second object information are approximations of the geometry of the object.

3. The parking support device according to claim 1 wherein the target parking position determined based on the first object information is a target parking position for a garage parking.

4. The parking support device according to claim 1 wherein the second object specifying unit generates the second object information using an approximate curve or an approximate straight line along the sequence of points the length of which exceeded the second reference length.

5. The parking support device according to claim 1 wherein the target parking position based on the first object information is determined based on endpoints of the object corresponding to the sequence of points the length of which is less than the second reference length and larger than the first reference length.

6. The parking support device according to claim 1, wherein the length of the sequence of points corresponds to a length between endpoints of the sequence of points.

7. The parking support device according to claim 1, wherein after the first object specifying unit makes a determination that the length of the sequence of points has exceeded the first reference length, the first object specifying unit determines whether detection of an entire object has been completed.

8. The parking support device according to claim 1, wherein the length of the sequence of points at least partially extends along a direction of a dimension of the object.

9. The parking support device according to claim 8, wherein the length of the sequence of points at least partially extends in a direction of the movement of the vehicle during measuring and storage of the sequence of points.

10. The parking support device according to claim 1, wherein the length of the sequence of points at least partially extends in a direction of the movement of the vehicle during measuring and storage of the sequence of points.

11. The parking support device according to claim 1, wherein the length of the sequence of points at least partially extends in a direction transverse to a direction of the distance from the vehicle to the object.

12. The parking support device according to claim 1, wherein after the second object specifying unit makes a determination that the length of the sequence of points has exceeded the second reference length, the second object specifying unit determines whether detection of an entire object has been completed.

13. The parking support device according to claim 12, wherein a temporary detection state is set in response to at least one determination that: (a) the length of the sequence of points is not larger than the second reference length, or (b) the detection of the entire object has not been completed.

14. A parking support device which supports running of an automotive vehicle to a target parking position, comprising:
   a distance measuring unit measuring a quantity equivalent to a distance from the vehicle to an object existing in a predetermined direction;
   a storage unit storing a sequence of points indicating results of the measurement performed by the distance measuring unit multiple times, wherein the sequence of points is based on a geometry of an object;
   a first object specifying unit which makes a determination of whether a length of the sequence of points increasing with a movement of the vehicle has exceeded a first reference length and which generates a first object information of the object based on the sequence of points when the length has exceeded the first reference length; and
   a second object specifying unit which makes a determination of whether a length of the sequence of points increasing with a further movement of the vehicle has exceeded a second reference length larger than the first reference length, and which generates a second object information of the object based on the sequence of points when the length has exceeded the second reference length,
   wherein a target parking position is determined based on both the second object information generated by the second object specifying unit and the first object information generated by the first object specifying unit after the second object information is generated, and
   wherein the first and second object information are approximations of the geometry of the object.

15. The parking support device according to claim 1, wherein the length of the sequence of points indicates a size of another vehicle.

16. The parking support device according to claim 15, wherein the size is a length of the other vehicle as measured in a direction of movement of the vehicle.

17. The parking support device according to claim 2, wherein the length of the sequence of points indicates a size of another vehicle.

18. The parking support device according to claim 17, wherein the size is a length of the other vehicle as measured in a direction of movement of the vehicle.

* * * * *